Oct. 19, 1954  H. W. HAPMAN  2,692,067
CONVEYER APPARATUS
Filed June 6, 1949  2 Sheets-Sheet 2

Inventor
Henry W. Hapman
Barthel & Bugbee
Attorneys

Patented Oct. 19, 1954

2,692,067

UNITED STATES PATENT OFFICE 2,692,067

CONVEYER APPARATUS

Henry W. Hapman, Hickory Corners, Mich., assignor of forty per cent to Hannah Jane Hapman, Detroit, Mich.

Application June 6, 1949, Serial No. 97,357

4 Claims. (Cl. 222—63)

This invention relates to conveyors and, in particular, to pressure-sealed conveyors.

One object of this invention is to provide a pressure-sealed conveying apparatus which will convey materials into or out of an enclosure which is under pressure above or below atmospheric pressure, without permitting blow-back or escape of gases or material being conveyed.

Another object is to provide a pressure-sealed conveying apparatus which is adapted to the controlled feeding of materials to a machine or treatment system, wherein the hopper or casing containing the material to be fed is sealed from the atmosphere and provision is made for preventing the entrance of moisture from the atmosphere, especially when the apparatus is temporarily not operating.

Another object is to provide a pressure-sealed conveying apparatus wherein the material to be conveyed is contained in a hopper or casing with an inclined bottom and the conveyor is likewise mounted in an inclined position so that the materials naturally slide down the inclined bottom toward the outlet from the casing into a discharge duct, the outlet and inlet to the casing through which the conveyor passes being provided with a pressure-sealing device adapted to seal off the casing or hopper from the discharge duct of the apparatus and thereby prevent blowback of solid or gaseous materials from the discharge duct into the casing.

Another object is to provide a pressure-sealed conveying apparatus of the foregoing character wherein "arching over" of the conveyed material above the outgoing course of the conveyor in the hopper or casing is prevented by causing the material descending in the hopper to pass through the incoming course of the conveyor before reaching the outgoing course, and also by providing a floating yielding mount for one of the pulleys or sprockets carrying the conveyor so that the conveyor and the pulley or sprocket may rise or fall and thereby break up any tendency for the material to arch over.

Another object is to provide a pressure-sealed conveying apparatus of the foregoing character having an air vent pipe in the lower portion of the hopper controlled by an electro-magnetically operated valve so controlled as to be open while the apparatus is in operation, such as by placing the electro-magnetically operated valve in circuit with the conveyor driving motor so as to be open when the motor is operating, thereby permitting air to escape as the material descends through the hopper into the conveyor void or sump, the valve automatically closing when the motor stops, thereby preventing moisture from the atmosphere from entering and adversely affecting deliquescent materials.

Another object is to provide a pressure-sealed conveying apparatus of the foregoing character, wherein a dehydrating agent, such as silica gel, is placed in the discharge duct to dehydrate the interior thereof while the apparatus is not in operation, the dehydrating agent being conveniently mounted on the inside of an access door which at the same time exposes the lower end of the conveyor.

Another object is to provide a pressure-sealed conveying apparatus of the foregoing character, wherein the outgoing and incoming courses of the conveyor are provided with pressure-sealing devices mounted on a support which is secured to the lower wall of the casing or hopper so as to be quickly and easily removable for repairs or replacement, such ease and rapidity of replacement being particularly advantageous in apparatus which operates intermittently but which is nevertheless not conveniently shut down over long periods of time.

Another object is to provide a pressure-sealed conveying apparatus of the foregoing character wherein the conveyor consists of an endless flexible member carrying yieldable flights of rubber-like material which pass over a V-grooved pulley preferably lined with rubber-like material, this pulley having the capability of squeezing out the liquid adhering to the conveyor flights as the flights pass over or around the pulley.

Another object is to provide an endless flight conveyor having a conveyor vibrating device which operates automatically in accordance with the motion of the conveyor to tap the flights of the conveyor and dislodge material therefrom at the discharge point of the conveyor.

In general, the pressure-sealed conveying apparatus of this invention consists of a material container or hopper in the form of a casing having an inclined bottom or conveyor void or sump through which an endless flight conveyor passes to and from a discharge duct located at the lower end of the casing. The outlet and inlet through which the outgoing and incoming courses of the flight conveyor pass are equipped with pressure-sealing devices of rubber-like material mounted on the partition wall between the casing and the discharge duct. The conveyor is preferably equipped with rubber-like flights mounted on an endless flexible member supported between V-pulleys, one of which is mounted upon a floating yielding mount so as to be capable of rising and falling. The outgoing and incoming courses of the conveyor are open so that the material descending through the casing or hopper may pass through the flights of the incoming or returning course, thereby reducing the tendency of the material to arch over the outgoing course of the conveyor.

The material container or hopper consists of an airtight casing having provision at the top for admitting a dry or inert gas, depending upon the materials to be handled by the conveyor, and an air outlet vent is provided at the bottom of the casing adjacent the conveyor and controlled by a valve so as to be open to release air from the lower portion of the casing as the material descends while the conveyor is in operation, yet to be closed while the apparatus is idle. The valve is preferably an electro-magnetic valve in circuit with the conveyor driving motor so as to be energized while the motor is energized and de-energized while the motor is de-energized. A conveyor vibrator consisting of a tapping hammer which rises and falls as the conveyor passes the discharge point, dislodges material tending to adhere to the conveyor flights.

The conveying apparatus of this invention is well adapted to the feeding of chemicals or other materials to a material processing installation or to a machine which utilizes such materials. One use of the apparatus, for example, is to feed a detergent to a bottle or dishwashing machine. Another use is to feed lime to a lime kiln. Still other uses are for feeding chemicals to petroleum refining or cracking installations.

Figures 1, 2:
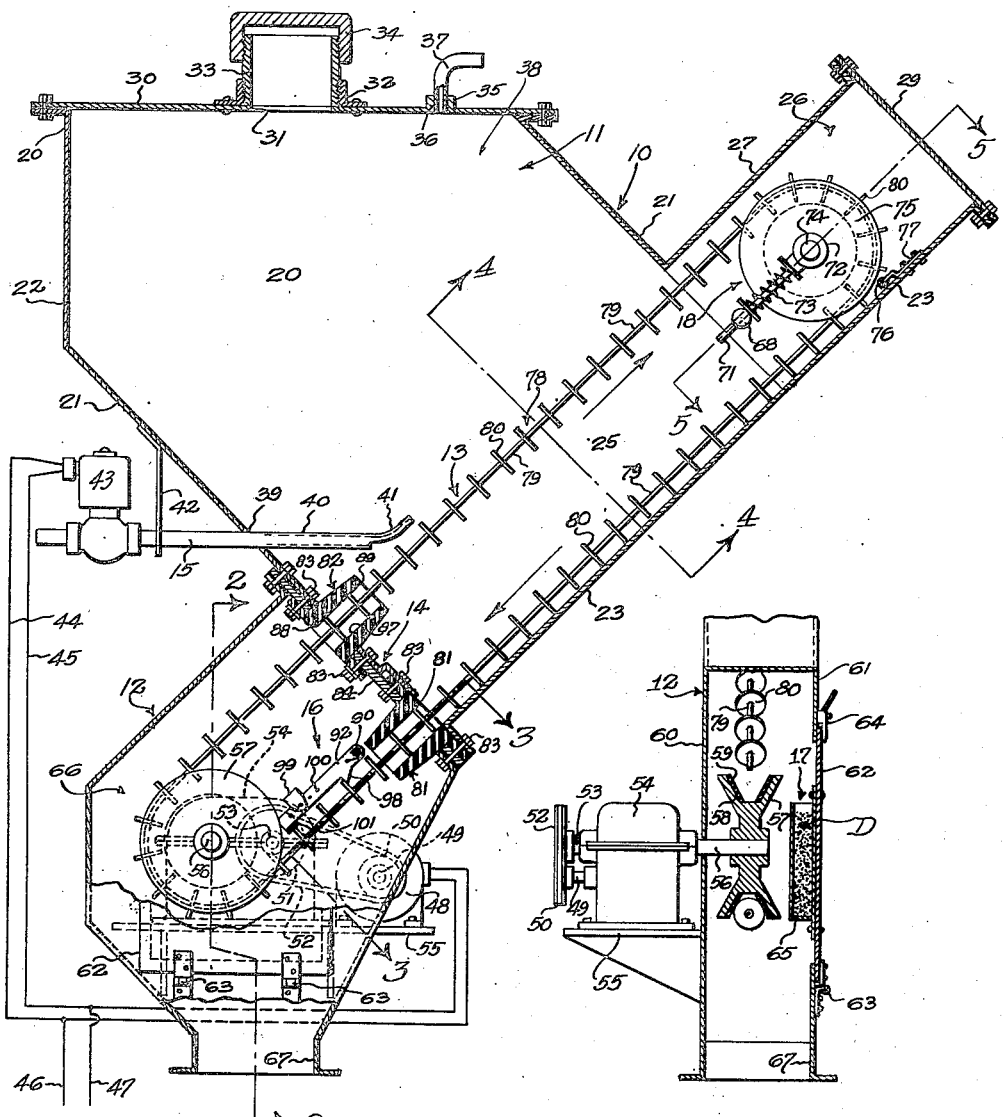
Figure 1 is a vertical section, partly in side elevation, through a pressure-sealed conveying apparatus, according to one form of the invention.
Figure 2 is a substantially vertical cross-section, taken along the line 2—2 in Figure 1.

Referring to the drawings generally, Figure 1 shows one form of the pressure-sealed conveying apparatus of this invention, generally designated 10 and consisting generally of a material container or hopper unit 11 having a discharge duct unit 12, both of these being traversed by an endless flight conveyor unit 13 equipped with a pressure-sealing unit 14 located in the partition wall between the container or hopper unit 11 and the discharge duct unit 12. The container 11 is equipped with an automatically controlled air vent device 15, whereas the conveyor unit 13 is equipped with a vibrator device 16 operated by the motion of the conveyor for tapping the flights so as to dislodge material tending to adhere to the conveyor flights at the discharge point. The discharge duct unit 12 contains a dehydrating unit 17 (Figure 2) for removing moisture from the interior or discharge chamber of the discharge duct 12. The conveyor unit 13 is also equipped with a yielding floating mount 18 for the upper end thereof, so as to permit the conveyor to rise and fall while maintaining an automatic takeup of slack therein.

Figure 5:
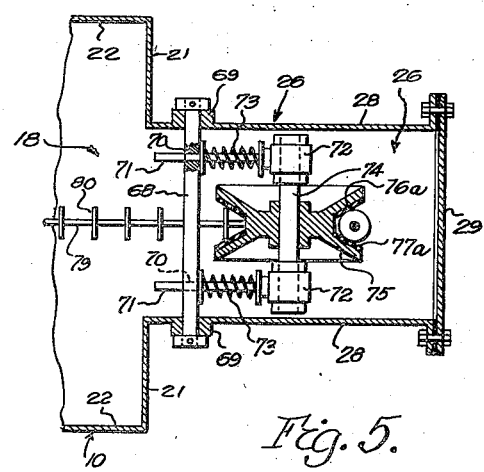
Figure 5 is an enclined longitudinal fragmentary section through the floating mount for the endless conveyor supporting pulley, taken along the line 5—5 in Figure 1.
Figure 4:
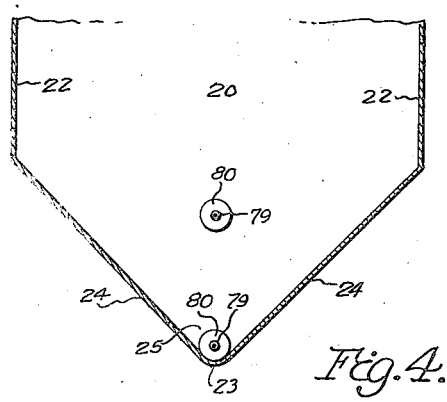
Figure 4 is a fragmentary inclined cross-section through the conveyor void or sump at the bottom of the material hopper, taken along the line 4—4 in Figure 1.

Referring to the drawings in detail, the container unit 11 consists of a casing or hopper 20 having inclined lower side walls 21, vertical upper side walls 22 (Figures 1 and 4), a V-shaped bottom wall 23 having oppositely inclined wall portions 24 forming a conveyor void or sump 25 at the bottom of the casing 20, and an extension 26 having an upper wall 27, side walls 28 and an end wall 29 bolted thereto (Figure 5). The bottom wall 23 of the casing 20 is extended upward to likewise form the bottom wall of the extension 26. The top of the casing 20 is closed by a cover plate 30 bolted thereto and having a filling opening 31 surrounded by an annular flange 32 of L-shaped or angle cross-section threaded to receive an inlet spout 33, the upper end of which is in turn threaded to receive a closure cap 34 (Figure 1). The cover plate 30 is also provided with a boss 35 containing an opening 36 into which a gas inlet pipe 37 is threaded for the purpose of supplying a dry or inert gas, such as nitrogen, to the container chamber or compartment 38.

The lower inclined side wall 21 immediately above the conveyor unit 13 is provided with an opening 39 through which a tubular air vent pipe 40 is inserted, the pipe 40 having a material deflector 41 overhanging its inner end. The outer portion of the pipe 40 is supported by a bracket 42 which is welded or otherwise secured to the inclined side wall 21. The air vent pipe 40 is provided with a normally closed electro-magnetically operated valve 43 which is connected by conductors 44 and 45 to the energization circuit conductors 46 and 47 respectively which supply electric current to a conveyor driving motor 48. The motor shaft 49 carries a pulley 50 which drives a pulley 51 by means of a belt 52, the pulley 51 being mounted upon the input shaft 53 of a speed reduction gear set 54. The motor 48 and reduction gear set 54 are mounted on a suitable support such as the shelf 55.

Mounted upon the output shaft 56 of the reduction gear set 54 is a conveyor driving pulley 57 having a V-groove 58 (Figure 2) with a side lining 59 of rubber-like material, such as rubber, synthetic rubber or the like. The shaft 56 extends through the side wall 60 of the discharge duct 12 and the opposite side wall 61 is provided with an access door 62 hinged thereto as at 63 and locked in its closed position by a latch 64. Mounted on the inner surface of the door 62 is a receptacle 65 for receiving a dehydrating agent D such as silica gel. This absorbs the moisture within the discharge duct chamber 66, particularly while the apparatus is at rest. The duct unit 12 containing the duct chamber 66 is provided with an outlet 67 leading to the disposal point of the material being conveyed.

Mounted on the side walls 28 of the casing extension 26 and extending therebetween is a shaft 68 (Figure 5) journaled in bearing bosses 69. The shaft 68 is provided with diametral cross bores 70 in which parallel rods 71 are slidably mounted. The rods 71 at their outer ends carry bearings 72 and are urged outwardly by coil springs 73. Journaled in the bearings 72 are the opposite ends of a pulley shaft 74 carrying a pulley 75 of similar construction to the pulley 57 and similarly provided with a V-groove 76a having a rubber-like lining 77a. Mounted upon the pulleys 57 and 75 is an endless flight conveyor 78 consisting of an endless flexible propelling member 79 such as a cable or chain, this cable or chain carrying spaced flights 80, of rubber-like material or metal, depending upon the nature of the material being conveyed. A roller 76 rotatably mounted upon a bracket 77 slidably and adjustably bolted to the bottom 23 is engaged by the successive flights 80 as they pass by, causing the pulley 75 and its mount to rise and fall, so as to prevent arching of the conveyed material over the bottom 23. The V-grooves 58 and 76a of the pulleys 57 and 75 exert a squeezing action upon the flights 80 so as to expel liquid therefrom as the flights pass around the pulleys.

Figure 3:
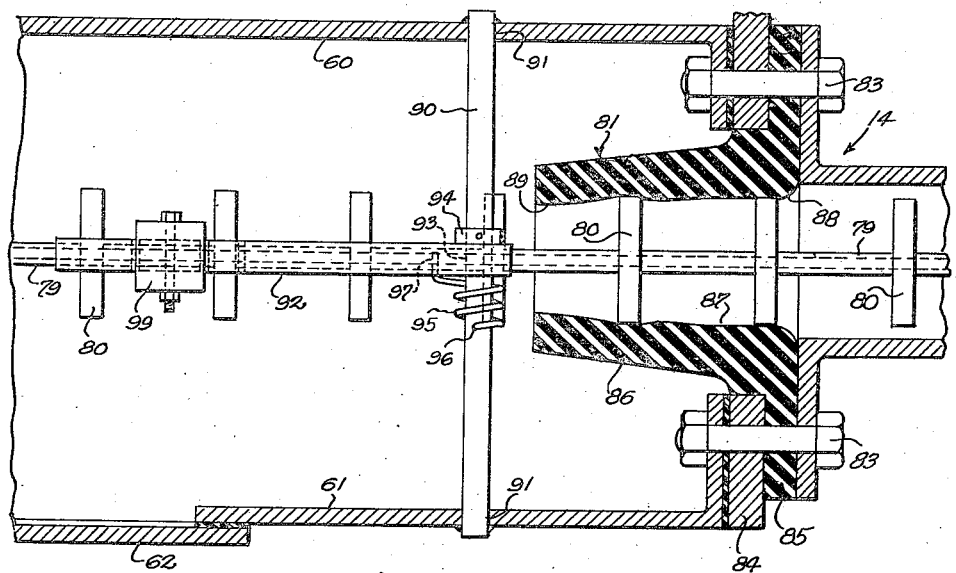
Figure 3 is an enlarged inclined longitudinal fragmentary section through one of the pressure-sealing devices, taken along the line 3—3 in Figure 1.

The endless flight conveyor 78 of the conveyor unit 13 passes through sealing devices 81 and 82 of similar construction but aimed in opposite directions. The sealing devices 81 and 82 are bolted as at 83 to an apertured plate 84 which, with the sealing devices 81 and 82 makes up the pressure sealing unit 14. Each sealing device consists of a peripheral flange 85 (Figure 3) and a tapered tubular nozzle portion 86 projecting therefrom in the direction of travel of the conveyor. The nozzle portion 86 is provided with an internal bore 87 which is flared as at 88 at its larger diameter end and tapers to a smaller diameter at the free end 89 thereof. The bore 87 is thus of slightly smaller diameter than the diameter of the conveyor flights 80 so as to maintain a sealing engagement therewith.

In order to dislodge material which might possibly adhere to the conveyor flights 80 after they have reached the discharge chamber 67 of the discharge duct 12, the vibrator device 16 is provided and is supported upon a shaft 90 (Figure 3) extending between the opposite side walls 60 and 61 of the discharge duct 12 which is bored as at 91 to receive it. The shaft 90 is secured in position as by welding at its outer end. Pivotally mounted on the shaft 90 is a vibrator arm 92 bored as at 93 to receive the shaft 90 and urged sidewise against a collar 94 by a coil spring 95 encircling the shaft 90. One end of the spring 95 is seated in a diametral hole 96 in the shaft 90, whereas the other end is seated in the socket 97 in the vibrator arm 92.

The lower portion of the vibrator arm 92 carries an inclined cam projection 98 (Figure 1) which is engageable with the flights 80 to lift the arm 92 as the flights pass beneath it. The arm 92 is provided with a weight 99 which is secured in any one of a number of holes 100 spaced along the arm 92. The outer end of the arm 92 is provided with a rubber or synthetic rubber pad 101 to avoid damage to the flights as they are tapped by the arm 92.

In operation, the hopper or casing 20 of the conveying apparatus 10 is filled with the material to be conveyed and the current supply wires 46, 47 for the driving motor 48 are energized. This starts the motor 48 in operation and at the same time energizes the electro-magnetic valve 43 to open this normally closed valve, opening the air vent tube 40 to the atmosphere. The rotation of the motor shaft 49 causes the rotation of the conveyor drive pulley 57 through the mechanism previously described, and this in turn causes the endless flight conveyor 78 of the conveyor unit 13 to move in its orbital path around the pulleys 57 and 75 in the direction indicated by the arrows. As the lower or outgoing course of the conveyor passes along the inclined bottom 23, it collects and carries along material which has fallen downward into the conveyor sump 25 (Figure 4) from the hopper 20. The conveyed material is carried by the flights 80 downward through the lower sealing device 81 of the sealing unit 14 into the discharge chamber 66 of the discharge duct unit 12 which, for example, is considered to be under pressure which is above or below atmospheric pressure. As the flights 80 pass through the slightly constricted bore 89 of the nozzle portion 86 of the sealing device 81, they expand the latter by pushing the walls outward (Figure 3), causing a sealing engagement which prevents the loss of pressure in either direction through the sealing device 81.

As the flights 80 emerge from the end 89 of the sealing device 81, the conveyed material drops by gravity through the outlet 67 of the discharge duct unit 12. The flights 80 then engage the inclined cam projection 98 on the vibrator arm 92 and swing it upward as each flight passes beneath it, permitting it to drop as the flight reaches the end of the inclined cam projection 98 (Figure 1). When this occurs, the vibrator arm 92 swings quickly downward, impelled by the weight 99 and spring 95. As the pad 101 on the end of the arm 92 hits the flight 80 in its path, it administers a sharp rap, thereby dislodging any particles of material which may have adhered to the flight or to adjoining portions of the flexible propelling member 79. The rubber-like flights 80 then pass around the V-groove 58 of the drive pulley 57, receiving a driving impulse from the pulley 57. If there is liquid adhering to the flights 80, this liquid is in part expelled by a squeezing action of the V-grooved pulley 57 upon the flights 80 as they pass around it.

After the flights 80 emerge from the V-groove 58 of the drive pulley 57, they pass through the upper sealing device 82 of the pressure sealing unit 14, with the same action resulting as occurred at the lower sealing device 81 (Figure 3), and with the same result of preventing escape of pressure in either direction. As the flights 80 emerge from the upper sealing device 82, the incoming or return course of the conveyor 78 of which they now form components passes through the material dropping downward into the conveyor sump 25 from the hopper 20, breaking up the material and assisting in preventing "arching over" of the material in the sump 25. At the same time, the idler or takeup pulley 75 is permitted to rise and fall as the conditions warrant, by reason of the swinging mounting of its shaft 74 upon the rods 71 which in turn are mounted upon the swinging shaft 68 (Figure 5), further preventing arching over. Simultaneously with this action, the springs 73 encircling the rods 71 push the bearings 72 upward and outward, moving the idler pulley shaft 74 farther away from the drive pulley shaft 56 and automatically taking up the slack in the flight conveyor 78.

In the meantime, as the material descends in the hopper or casing 20 of the container unit 11, the air entrapped beneath it is forced out through the air vent pipe 40, escaping through the now open electro-magnetic valve 43. If the material conveyed is affected by the atmosphere, such as if it is hygroscopic or deliquescent, or easily oxydizable, a dry or inert gas such as nitrogen is supplied through the pipe 37 to fill the upper portion of the hopper or casing 20. The material is replenished by removing the filling cap 34 and inserting more material through the filling spout 33.

When the desired amount of material has been conveyed, for the time being, and the current supply lines 46 and 47 have been de-energized, the motor 48 halts and the venting valve 43 automatically returns to its normally closed position, preventing air from entering the casing 20 through the vent pipe 40. Meanwhile, the dehydrating agent D, such as silica gel, absorbs the moisture in the discharge duct chamber 66 and keeps it dry, under circumstances where it is desired to maintain the chamber in a dry condition.

The apparatus of the present invention is well adapted to the controlled feeding of predetermined amounts of material according to the demand as regulated by certain instruments. For example, the energization of the current supply lines 46 and 47 may be controlled in response to the viscosity of a solution in an apparatus into which the discharge duct outlet 67 opens. Thus, for example, in a bottle or dish washing machine, the viscosity of the washing solution in this manner controls the feed of detergent materials under accurately regulated conditions. Such control instruments are conventional and their details form no part of the present invention.

Since the bottom wall 21 of the container unit 11 is inclined downward at a relatively sharp angle, all the material will slide out of the spout-like sealing device 81 by gravity. Gravity thus assists in the operation of the apparatus, both by facilitating the descent of the conveyed material in the casing or hopper 29 and also in the delivery of the material to the discharge duct unit 12 through the sealing device 81. The apparatus is thus especially well adapted for the intermittent feeding of material to a machine or processing apparatus utilizing the material. Between periods of operation of the apparatus, such as when used for feeding lime to a lime kiln, the sealing unit 14 can easily be removed for repairs or replacement by removing the plate 84 or by unbolting the bolts 83 which hold the sealing devices 81 and 82.

What I claim is:

1. A conveyor apparatus comprising a material container having an outlet opening in the lower portion thereof, a conveyor disposed in said lower portion of said container and extending downward to said outlet opening, an air vent passageway opening into the atmosphere from said lower portion of said container above said outlet opening, a valve in said passageway arranged to selectively open and close said passageway, conveyor driving mechanism drivingly connected to said conveyor, and means responsive to the energization and de-energization respectively of said driving mechanism for opening and closing said valve.

2. A conveyor apparatus comprising a material container having an outlet opening in the lower portion thereof, a conveyor disposed in said lower portion of said container and extending downward to said outlet opening, an air vent passageway opening into the atmosphere from said lower portion of said container above said outlet opening, an electric motor drivingly connected to said conveyor, a normally closed valve in said passageway and an electromagnetic valve operator operatively connected to said valve and electrically connected in circuit with said motor, said valve operator actuating said valve to open said passageway in response to the energization of said valve operator and said motor.

3. A conveyor apparatus comprising a material container having laterally-spaced sidewalls, a downwardly-inclined elongated bottom wall, and a lower end wall disposed angularly to said bottom wall at the lower end of said bottom wall; said lower end wall having an outlet therein substantially aligned with the inner surface of said bottom wall and an inlet spaced above said outlet, and an endless flight conveyor disposed partly within said container between said sidewalls, said conveyor having a downwardly-inclined outgoing course disposed substantially in engagement with said bottom wall and extending outwardly through said outlet, said conveyor also having an upwardly-inclined incoming course extending inwardly through said inlet into said container above said outgoing course and in the path of material descending through said container to said bottom wall and outgoing course whereby said incoming course breaks up any material otherwise tending to arch over said outgoing course between said sidewalls.

4. A conveyor apparatus comprising a material container having laterally-spaced sidewalls, a downwardly-inclined elongated bottom wall, and a lower end wall disposed angularly to said bottom wall at the lower end of said bottom wall; said lower end wall having a downwardly-inclined tubular outlet therein substantially aligned with the inner surface of said bottom wall and an upwardly-inclined tubular inlet spaced above said outlet, and an endless flight conveyor disposed partly within said container between said sidewalls, said conveyor having a downwardly-inclined outgoing course disposed substantially in engagement with said bottom wall and extending outwardly through said outlet said conveyor also having an upwardly-inclined incoming course extending inwardly through said inlet into said container above said outgoing course and in the path of material descending through said container to said bottom wall and outgoing course whereby said incoming course breaks up any material otherwise tending to arch over said outgoing course between said sidewalls, said conveyor having substantially circular disc flights thereon, said tubular outlet and said tubular inlet having passageways therethrough of substantially circular cross-section disposed with their axes substantially parallel to one another, said passageways having internal diameters approximately equal to the external diameters of said flights, said flights snugly but slidably engaging the walls of said passageways.

References Cited in the file of this patent

UNITED STATES PATENTS

| Number | Name | Date |
|---|---|---|
| 1,044,082 | Prior | Nov. 12, 1912 |
| 1,089,657 | Maddux | Mar. 10, 1914 |
| 1,100,992 | Sallee | June 23, 1914 |
| 1,898,134 | Linder | Feb. 21, 1933 |
| 1,971,716 | Hitchcock | Aug. 28, 1934 |
| 2,120,003 | Schanz | June 7, 1938 |
| 2,331,724 | Plant | Oct. 12, 1943 |
| 2,428,995 | Rogers | Oct. 14, 1947 |
| 2,456,760 | Whitney | Dec. 21, 1948 |
| 2,508,195 | Seaman et al. | May 16, 1950 |